US006050176A

United States Patent [19]
Schultheis et al.

[11] Patent Number: 6,050,176

[45] Date of Patent: Apr. 18, 2000

[54] ARRANGEMENT OF A HOT PLATE IN A COOK TOP

[75] Inventors: Bernd Schultheis, Schwabenheim; Martin Taplan, Rheinböllen, both of Germany

[73] Assignee: Schott Glas, Mainz, Germany

[21] Appl. No.: 09/176,981

[22] Filed: Oct. 22, 1998

[30] Foreign Application Priority Data

Oct. 23, 1997 [DE] Germany .......................... 197 46 845

[51] Int. Cl.[7] .............................. A47J 37/00; F24C 3/00; H05B 1/02; H05B 3/68

[52] U.S. Cl. ........................... 99/339; 99/422; 126/39 R; 126/39 K; 219/445.1; 219/452.12

[58] Field of Search ............................. 99/326–333, 339, 99/422, 340, 349, 389, 451, 378, 447, 449, 400, 401; 126/214 A, 39 A, 39 B, 39 N, 39 R, 214 C, 214 D, 211, 39 K, 221, 42, 494, 497; 219/445.1, 506, 452.12, 451.1, 448.1, 458.17, 448.11, 462.1, 400; 392/418, 422

[56] References Cited

U.S. PATENT DOCUMENTS 5,227,610 7/1993 Schultheis et al. ................ 219/506 X
5,313,929 5/1994 Thurk et al. ......................... 126/39 B
5,813,395 9/1998 Taplan et al. ....................... 126/214 A

FOREIGN PATENT DOCUMENTS 0069298 1/1983 European Pat. Off. .
29702418 3/1997 Germany .
9609738 3/1996 WIPO .

*Primary Examiner*—Timothy Simone
*Attorney, Agent, or Firm*—Nils H. Ljungman & Associates

[57] ABSTRACT

Arrangement of an electrical heating element as a cooking zone, having as a carrier a ceramic of very high thermal conductivity, in a cutout of a surface consisting of glass-ceramic, glass, ceramic, metal or plastic. The ceramic carrier of the heating element can rest with overlap on regions of the surface which deviate from the main plane of the plate-like surface so as form elevations running linearly, such as cone frustums, spherical segments and/or cones, and which define the edge of the cutout. This elevated rest of the heating element serving as a bearing, and the underside of the surface serving as an abutment for a cover arranged below the main plane of the surface and closing off the cutout downwards, and the heating element being fixed positively and non-positively in the cutout of the surface by way of fastening elements connected firmly to the heating element and firmly and releasably to the cover.

20 Claims, 2 Drawing Sheets

ARRANGEMENT OF A HOT PLATE IN A COOK TOP

BACKGROUND OF THE INVENTION

1. Field of the Invention

The present invention relates to the arrangement of an electrical heating element as a cooking zone or area or ring or hob, having as a carrier a ceramic of very high thermal conductivity, in a cutout of a surface consisting of glass-ceramic, glass, ceramic, metal or plastic.

2. Background Information

Cooking appliances having glass-ceramic cooking surfaces are known. In these appliances, the cooking zones can be heated, as a rule, by means of electrically operated or gas-operated heating devices arranged below the glass-ceramic cooking surface in the region of the cooking zones. These devices can be, for example, electrically operated contact-heating or radiant heating elements or else gas-jet burners.

One disadvantage of known cooking appliances is the delayed emission of heat through the plate onto the product to be heated, along with a correspondingly lower utilization of the energy of the heating medium (efficiency) and, as a result, a longer cooking time.

The use of electrical heating elements as cooking zones or cooking plates, having as a carrier an electrically insulating ceramic which, nevertheless, has very high thermal conductivity, in electrical cooking appliances is known per se, for example from European Patent No. 0,069,298 B1. This publication refers, inter alia, to the fact that silicon nitride is particularly suitable as cooking-plate material on account of its high thermal conductivity, low thermal expansion and, at the same time, high resistance to cyclic temperature stress. According to this European patent specification, the material has high mechanical strength and can therefore be designed as a thin plate. This results in the plate having a low thermal capacity, so as also to substantially ensure that the heat supply can be regulated quickly and without any inertia or lag.

The subject of WO 96/09738 is likewise an electrical heating element which element has an electrically insulating thermally conductive carrier consisting of ceramic, in particular of silicon nitride, and an electrically conductive layer or foil applied to it and provided with electrical contacts, the carrier being designed to be plate-like and so solid that it acts as a heat sink.

Due to the high thermal conductivity of the ceramic, the heat flow through the cooking plates to the product to be heated is particularly high; the heating-up speed, reaction speed and energy utilization are therefore particularly advantageous here.

On the other hand, because of the very high thermal conductivity of the ceramic, a one-piece cooking surface cannot be used, as is possible in the case of cooking appliances having glass-ceramic cooking surfaces, since the heat would then flow away out of the hot region. In such a case, energy utilization would be impaired and the temperatures permissible on the frame of the appliance would likely be exceeded. It is therefore necessary for such a heating element as a cooking zone, having as a carrier a ceramic of very high thermal conductivity, to be inserted into a baseplate so as to be thermally insulated.

Furthermore, the high thermal conductivity of the ceramic material prevents multi-circuit cooking zones from being designed with diameters or boiling zones adapted to the cooking utensil and having independently switchable and controllable zones, such as have already been known for years in the case of glass-ceramic cooking surfaces and are generally used to good effect. Specifically, here, adjacent zones would also be mutually heated.

Thus, despite the above-mentioned advantages, as compared with cooking appliances having glass-ceramic cooking surfaces or zones, cooking appliances, the cooking zones of which are formed solely by ceramic cooking plates of very high thermal conduction have a whole series of disadvantages.

These disadvantages are taken into account in German Utility Model 297 02 418.3, the subject of which is a cooking appliance having a glass-ceramic cooking surface with a plurality of cooking zones, at least one of which is designed as a high-speed cooking zone, the cooking zones being treatable essentially by means of electrically operated heating devices, and the high speed cooking zone being formed by a ceramic cooking plate integrated into the glass-ceramic cooking surface, the ceramic cooking plate preferably comprising $Si_3N_4$ or SiC.

According to this utility model, the ceramic cooking plate either is inserted directly into the glass-ceramic cooking surface or is glued by means of a silicone adhesive into a corresponding cutout in the glass-ceramic cooking surface, or the ceramic cooking plate is inserted into a plate consisting of thermally insulating ceramic, of metal or of prestressed glass and the latter plate is, in turn, inserted into a cutout of the glass-ceramic cooking surface.

However, all these assembling and glueing methods have considerable disadvantages in practice and in long-term use. Ceramic plates can have appreciable thermal expansion. Since a cooking plate consisting of ceramic therefore expands during operation, high operating temperatures should not occur when such a cooking plate is assembled together with, for example, brittle materials, such as glass-ceramic, glass or ceramic. Alternatively, glueing may be carried out with a permanently elastic material. However, these permanently elastic materials are also resistant typically only up to about 300° C. Furthermore, the tempering resistance of ceramic plates is typically around 300 K.

The operating temperature of such ceramic cooking plates is therefore restricted to about 250° C. to at most about 300° C. However, so that the ceramic cooking plate can be used at these lower temperatures, it is necessary to use costly special pots having a highly planar bottom which is likewise of very high thermal conductivity.

By contrast, because of the lack of planeness in the bottoms of commercially available utensils, cooking zone temperatures of up to 600° C. can be required in order to bring the product to be heated to the boil swiftly. For this purpose, therefore, special temperature sensors and regulating devices are additionally necessary in cooking appliances having ceramic cooking plates.

OBJECT OF THE INVENTION

The object of the present invention is, therefore, to present an arrangement, in which an electrical heating element as a cooking zone, having as a carrier an electrically insulating ceramic which, however, is of very high thermal conductivity, is integrated in a cutout of a cooking surface consisting of glass-ceramic or of a surface of glass or ceramic, metal or plastic, without any adhesive bonding, the arrangement being electrically reliable, highly heat resistant (400° C. to 500° C.) and leak-tight against the penetration of liquids into the interior of the appliance.

Furthermore, the object of the invention is to take into account the respective particular properties of the materials involved in this arrangement and to allow a markedly higher operating temperature of the ceramic heating elements of up to about 500° C.

SUMMARY OF THE INVENTION

This object can be achieved in that the ceramic carrier of the heating element can rest with an overlap on regions of the surface which deviate from the main plane of the plate-like surface. These overlaps can form elevations in the form of a circular line, or, alternatively, of an oval or elliptic shape, such as circular cone frustums, spherical segments and/or circular cones, and which define the edge of the cutout. The elevated rest of the heating element can serve as a bearing, and the underside of the surface serving as an abutment for a cover arranged below the main plane of the surface and closing off the cutout downwards. The heating element can be fixed positively and non-positively in the cutout of the surface by means of fastening elements connected firmly to the heating element and firmly and releasably to the cover.

The non-positive connection can be, for example, a friction fit or slip fit or other similar type of connection. The positive connection can be, for example, a weld or solder, or threading, or other similar type of connection.

Thus, according to the present invention, the retention of the ceramic heating elements by means of a simple clamping device can be substantially ensured. In this case, there is not necessarily any need for a special seal which, in turn, would limit the operating temperature, since by virtue of the special shaping, bulges resembling cone frustums or spherical segments in a preferred embodiment, liquid is prevented from penetrating between the ceramic heating element and the moulding.

In a preferred embodiment, the moulding can be a prestressed glass or glass-ceramic surface which is curved upwards peripherally in the edge region around the ceramic heating element.

In one embodiment, the cover closing off the cutout in the surface downwards and arranged below the main plane of the surface can be formed in one part from the surface itself by suitable shaping. In another embodiment, this cover can be designed as a separate part, in particular comprising metal or plastic.

In this case, the cover can have orifices, in particular catch receptacles, by means of which orifices the fastening elements connected firmly to the heating element can be connected firmly and releasably, with a catching effect, in particular by means of catch noses of snap hooks.

Another possible embodiment is for the cover to have at least one orifice, by means of which orifice the fastening element or fastening elements connected firmly to the heating element can be connected firmly and releasably, in particular by means of a screw nut and a screw bolt as a fastening element.

A combination of catch and screw connections may also be provided successfully in specific arrangements. In this case, the firm connection of the fastening element to the heating element is achieved preferably by means of a hard-solder joint.

In order to avoid damage to the surface and the cover and the undesirable dissipation of heat, a further material, in particular also functioning as a gasket, can be arranged in the contact region between the ceramic carrier of the heating element and the surface and/or the cover.

Graphite-containing and/or ceramic fibre materials are preferably used for this purpose.

In a highly preferred arrangement, the space between the underside of the ceramic carrier of the heating element and the topside of the cover closing off the cutout downwards can contain heat-insulating and/or electrically insulating materials, heating conductors, electrical leads, cable-strain relief devices and cable leadthroughs also advantageously being arranged in this space.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

At least one preferred embodiment of the present invention is illustrated in the drawings, in which.

DESCRIPTION OF THE PREFERRED EMBODIMENT

Figure 1:
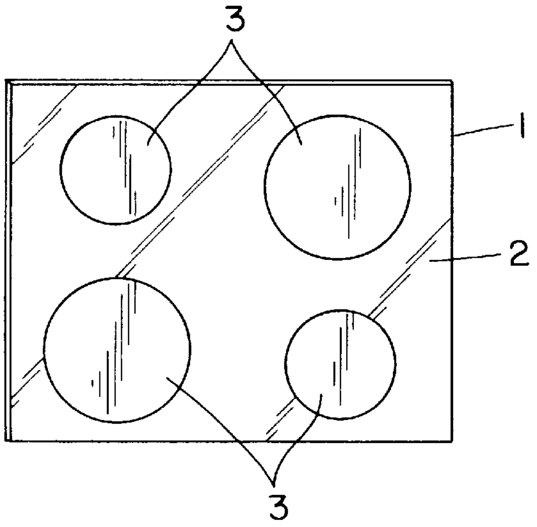
FIG. 1 shows a diagrammatic top view of the arrangement of a cooking hob.

FIG. 1 shows a diagrammatic top view of the arrangement of a cooking hob 1 having a moulding 2 as a cooking surface comprising glass-ceramic and having ceramic heating elements 3 integrated therein. However, the moulding may also comprise, as the surface, a metallic material or of a special thermally resistant plastic, for example of duroplastic material (for example, UP or MF) or thermoplastic material (for example, PEI, PPS, PES, PPA, PET, PBT).

The ceramic heating elements 3 conventionally comprise silicon nitride, $Si_3N_4$, silicon carbide, SiC, or more rarely aluminium oxide, $Al_2O_3$, or aluminium nitride, AlN, or, alternatively, corresponding mixed ceramics are applied to the heating conductors 4 which are connected electrically to corresponding leads 12.

Figure 2:
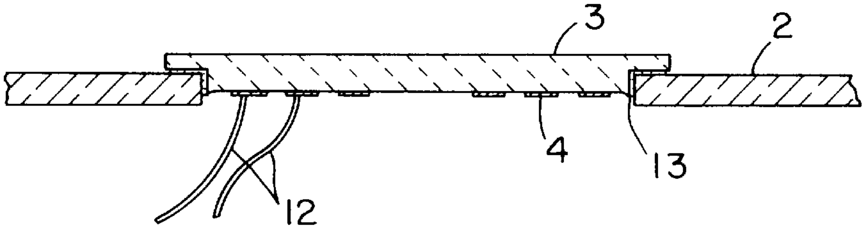
FIG. 2 shows the hitherto conventional installation arrangement in section (according to the prior art)

FIG. 2 shows in section the hitherto conventional installation situation, in which the ceramic heating elements 3 are glued by means of silicone 13 into the moulding surrounding them, as a rule a prestressed glass or glass-ceramic surface. The silicone adhesive 13 currently limits the operating temperature to a maximum of about 250° C. Other adhesives are not used because of their insufficient permanently elastic properties. The often different thermal expansions of the materials involved, on one side, for example, glass-ceramic, for example CERAN (alpha less than about $0.2*10^{-6}$/K) and, on the other side, $Si_3N_4$ (alpha approximately equal to $3.5*10^6$/K), substantially prevent the use of ceramic adhesive compounds.

Figure 3:
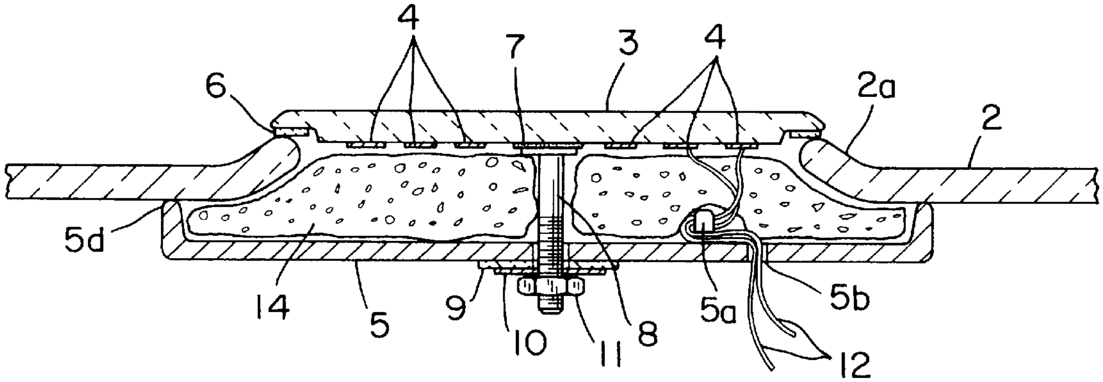
FIG. 3 shows one possible arrangement according to the present invention in section.

FIG. 3 shows, in section, a preferred possible design according to the present invention. In this embodiment, the ceramic heating element 3 having the, preferably, printed on heating conductors 4 overlaps the peripherally upwardly curved edge region 2*a* of the glass or glass ceramic cooking surface 2. In this embodiment, a screw bolt 8 is attached to the ceramic heating element by means of one or more hard-solder joints 7 and projects through an orifice of a dish-like sheet-metal or plastic part or base 5. The dish-like cover 5 is held by means of a U-washer 10 and a screw nut 11. A further washer comprising heat-insulating material 9, for example FIBERFRAX or the like, prevents the excessive transmission of heat to the cover 5. This can be particularly important when the cover 5 is produced from plastic, for example from the same plastics from which the cooking surface can be manufactured as the moulding 2.

If the cover 5 is manufactured from plastic, this affords the advantage that cable-strain relief devices 5*a* and cable leadthroughs 5*b* can be integrally formed as early as during the production process. Should the cover 5 be manufactured from metal, an intermediate layer is necessary in the contact region 5*d*, so as not to damage the underside, if the moulding 2 is manufactured from brittle materials, such as glass, glass-ceramic or ceramic. The intermediate layer 6, for example comprising graphite-containing materials and/or of ceramic fibre materials, can serve additionally for heat insulation or as a gasket, but, because of the shaping of the body 2 and if the moulding 2 is manufactured from heat-resistant glass or from heat-resistant glass-ceramic (examples: prestressed borosilicate glass; CERAN or ROBAX), is not necessary.

The cavity between the heating element 3 and cover 5 is lined by means of an insulating material 14.

Figure 4:
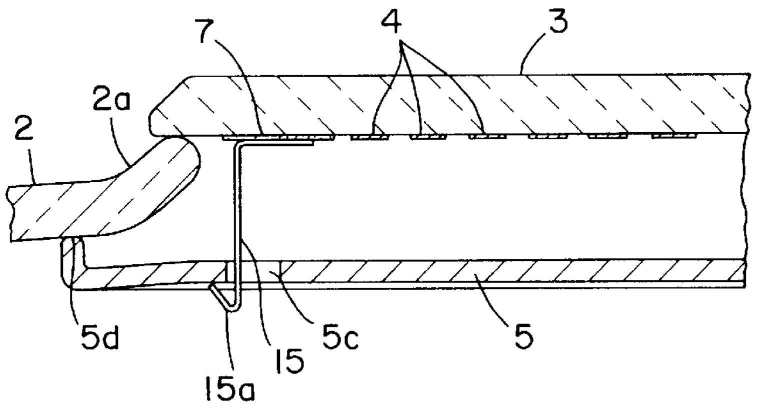
FIG. 4 shows another possible arrangement according to the present invention in section.

FIG. 4 shows another embodiment of an arrangement of this type, in which the ceramic heating element 3, together with the heating conductors 4, rests directly on the edge of the moulding 2 comprising heat-resistant glass or glass-ceramic. In this case, the connection with the cover 5 is made by means of one or more spring-steel snap hooks 15 which snap hooks 15 can be fastened to the ceramic heating element on the underside by means of a hard-solder joint 7. In this case, the catch nose 15*a* projects through the corresponding orifice 5*c*, thus resulting in fitting which is highly cost effective, as compared with known devices.

Figure 5:
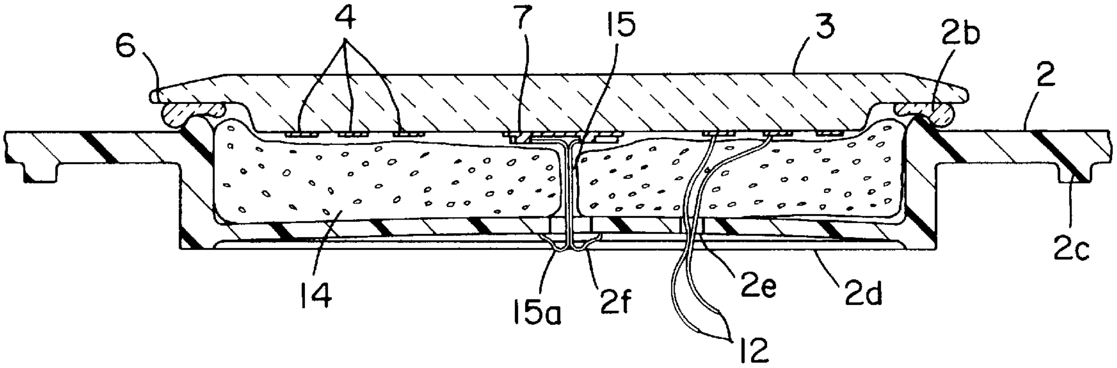
FIG. 5 shows a further variant of the arrangement according to the present invention.

FIG. 5 shows another possible design, in which the moulding 2 is manufactured from plastic and likewise possesses on its topside a peripheral bulge 2*b*, on which the heating element 3 rests. The rest, which tapers in section, can prevent excessive heat conduction. Additional insulating materials, for example graphite-containing laminated materials and/or ceramic fibre materials, can further lower the contact temperature for the plastic. It is particularly advantageous, in this case, that the ceramic heating elements 3 can be inserted with their catch hooks 15 into carrier plates 2 shaped directly for this purpose and taking the form of a moulding. By virtue of the production processes, conventionally injection-moulding or hot-pressing, carrier plates 2 of this type can be produced in one step so as already to have reinforcing ribs 2*c*, a bottom part 2*d*, cable orifices 2*e* and catch receptacles 2*f*.

The present invention affords a simple and inexpensive possibility of integrating and fitting ceramic heating elements into cutouts in mouldings comprising brittle materials, such as glass, glass ceramic, ceramic, or of metallic materials or plastics. This entails at least the following advantages:

Optimum adaptation to the materials involved is ensured.

A sealing effect is possible, even in the case of widely differing materials.

An increased working temperature above 250° C., conventional hitherto, becomes possible (up to or above 400° C.), with the result that utensils of average quality can also be used.

Simple demounting/fitting is possible during servicing.

Simple recycling due to fully graded separation.

One feature of the invention resides broadly in the arrangement of an electrical heating element as a cooking zone, having as a carrier a ceramic of very high thermal conductivity, in a cutout of a surface consisting of glass-ceramic, glass, ceramic, metal or plastic, characterized in that the ceramic carrier of the heating element rests with overlap on regions of the surface which deviate from the main plane of the plate-like surface so as to form elevations running linearly, such as cone frustums, spherical segments and/or cones, and which define the edge of the cutout, this elevated rest of the heating element serving as a bearing, and the underside of the surface serving as an abutment for a cover arranged below the main plane of the surface and closing off the cutout downwards, and the heating element being fixed positively and nonpositively in the cutout of the surface by means of fastening elements connected firmly to the heating element and firmly and releasably to the cover.

Another feature of the invention resides broadly in the arrangement characterized in that the elevations running linearly are of circular or oval or elliptic design, in particular are designed as circular cone frustums and/or circular cones.

Yet another feature of the invention resides broadly in the arrangement characterized in that the cover closing off the cutout in the surface downwards and arranged below the main plane of the surface is formed in one part from the cooking surface itself by suitable shaping.

Still another feature of the invention resides broadly in the arrangement characterized in that the cover closing off the cutout in the surface downwards and arranged below the main plane of the surface is designed as a separate part, in particular consisting of metal or plastic.

A further feature of the invention resides broadly in the arrangement characterized in that the cover has orifices, in particular catch receptacles, by means of which the fastening elements connected firmly to the heating element can be connected firmly and releasably, with a catching effect, in particular by means of catch noses of snap hooks.

Another feature of the invention resides broadly in the arrangement characterized in that the cover has at least one orifice, by means of which the fastening element or fastening elements connected firmly to the heating element can be connected firmly and releasably, in particular by means of a screw nut and a screw bolt as a fastening element.

Yet another feature of the invention resides broadly in the arrangement characterized in that the firm connection of the fastening element to the heating element is a hard-solder joint.

Still another feature of the invention resides broadly in the arrangement characterized in that a further material, in particular functioning as a gasket, is arranged in the contact region between the ceramic carrier of the heating element and the surface and/or the cover.

A further feature of the invention resides broadly in the arrangement characterized in that the gaskets consist of a graphite-containing and/or ceramic fibre material.

Another feature of the invention resides broadly in the arrangement characterized in that the space between the underside of the ceramic carrier of the heating element and the topside of the cover closing off the cutout downwards contains heat-insulating and/or electrically insulating materials.

Yet another feature of the invention resides broadly in the arrangement characterized in that heating conductors, electrical leads, cable-strain relief devices and cable leadthroughs are arranged in the space between the underside of the ceramic carrier and the topside of the cover.

Some examples of stoves and ranges which may possibly be utilized or adapted for use in the context of the present invention may be disclosed in the following U.S. patent: No. 5,213,091, issued on May 25, 1993; No. D336,210, issued on Jun. 8, 1993; No. 5,280,152, issued on Jan. 18, 1994; No. 5,290,997, issued on Mar. 1, 1994; No. 5,400,765, issued on Mar. 28, 1995; No. D359,345, issued on Jun. 13, 1995; No. D361,015, issued on Aug. 8, 1995; and No. 5,464,005, issued on Nov. 7, 1995.

Some examples of burners and related components which may possibly be utilized or adapted for use in the context of the present invention may be disclosed in the following U.S. patents: No. 4,758,710, issued on Jul. 19, 1988; No. 4,899,723, issued on Feb. 13, 1990; No. 5,186,158, issued on Feb. 16, 1993; No. D333,943, issued on Mar. 16, 1993; No. 5,323,759, issued on Jun. 28, 1994; No. 5,329,918, issued on Jul. 19, 1994; No. 5,397,234, issued on Mar. 14, 1995; No. 5,397,873, issued on Mar. 14, 1995; No. 5,400,765, issued on Mar. 28, 1995; and No. 5,437,262, issued on Aug. 1, 1995;

Some examples of related components for stoves and ranges which may possibly be utilized or adapted for use in the context of the present invention may be disclosed in the following U.S. patents: No. 5,220,155, issued on Jun. 15, 1993; No. 5,245,159, issued on Sep. 14, 1993; No. 5,343,020, issued on Aug. 30, 1994; No. 5,377,660, issued on Jan. 3, 1995; No. 5,380,985, issued on Jan. 10, 1995; and No. 5,400,766, issued on Mar. 28, 1995.

Some examples of cooking hobs and cooktops which may possibly be utilized or adapted for use in the context of the present invention may be disclosed in the following U.S. patents: No. 5,406,932, issued on Apr. 18, 1995; No. 5,422,460, issued on Jun. 6, 1995; No. 5,424,512, issued on Jun. 13, 1995; No. 5,425,353, issued on Jun. 20, 1995; No. 5,429,114, issued on Jul. 4, 1995; and No. 5,448,036, issued on Sep. 5, 1995;

Some examples of ceramic plates or hot plates which may possibly be utilized or adapted for use in the context of the present invention may be disclosed in the following U.S. patents: No. 3,596,650, issued on Aug. 3, 1971; No. 3,870,861, issued on Mar. 11, 1975; No. 4,414,465, issued on Nov. 8, 1983; No. 4,634,841, issued on Jan. 6, 1987; and No. 5,397,873, issued on Mar. 14, 1995.

Some examples of resistors printed on or disposed on a ceramic material which may possibly be utilized or adapted for use in the context of the present invention may be disclosed in the following U.S. patents: No. 4,004,130, issued on Jan. 18, 1977; No. 4,160,897, issued on Jul. 10, 1979; No. 4,762,982, issued on Aug. 9, 1988; No. 5,264,681, issued on Nov. 23, 1993; and No. 5,700,338, issued on Dec. 23, 1997.

Some examples of ceramic materials which may possibly be utilized or adapted for use in the context of the present invention may be disclosed in the following U.S. patents: No. 5,385,873, issued on Jan. 31, 1995; No. 5,407,740, issued on Apr. 18, 1995; No. 5,420,399, issued on May 30, 1995; No. 5,422,319, issued on Jun. 6, 1995; No. 5,449,649, issued on Sep. 12, 1995; No. 5,476,684, issued on Dec. 19, 1995; and No. 5,691,261, issued on Nov. 25, 1997.

Some examples of adhesive materials which may possibly be utilized or adapted for use in the context of the present invention may be disclosed in the following U.S. patents: No. 5,225,662, issued on Jul. 6, 1993; No. 5,268,338, issued on Dec. 7, 1993; No. 5,288,674, issued on Feb. 22, 1994; No. 5,300,627, issued on Apr. 5, 1994; No. 5,403,228, issued on Apr. 4, 1995; No. 5,432,320, issued on Jul. 11, 1995; No. 5,468,290, issued on Nov. 21, 1995; and No. 5,475,044, issued on Dec. 12, 1995.

Some examples of thermally insulating materials which may possibly be utilized or adapted for use in the context of the present invention may be disclosed in the following U.S. patents: No. 5,408,832, issued on Apr. 25, 1995; No. 5,420,401, issued on May 30, 1995; No. 5,449,232, issued on Sep. 12, 1995; No. 5,456,682, issued on Oct. 10, 1995; and No. 5,469,683, issued on Nov. 28, 1995.

German Patent No. 30 49 491 C2, German Patent No. 42 27 672C2, French Patent No. 2 626 964, European Patent No. 0 069 298 B1and German Patent Application No. 197 05 715.2-16 are hereby incorporated as if set forth in their entirety herein.

U.S patent application Ser. No. 09/022,918, entitled "COOKING UNIT, SUCH AS A STOVE, FOR COOKING FOOD", filed on Feb. 12, 1998, and having the inventors Dr. Peter Nass, Dr. Patrick Hoyer and Dr. Kurt Schaupert, is hereby incorporated by reference as it set forth in its entirety herein.

U.S. patent application Ser. No. 09/022,466, entitled "COOKING APPLIANCE, SUCH AS A STOVE, WITH A GLASS CERAMIC HOB OR COOKTOP WITH A RAPID COOKING RING OR HOTPLATE", filed on Feb. 12, 1998, and having the inventors Martin Taplan, Herwig Scheidler and Christof K6ster is hereby incorporated by reference as if set forth in its entirety herein.

U.S. patent application, Ser. No. 09/177,336, filed on or about Oct. 22, 1998, having the inventor Bernd Schultheis, having Attorney Docket No. NHL-SCT-04 US, entitled "COOKING APPLIANCE SUCH AS A STOVE WITH AN ARRANGEMENT OF A CERAMIC HEATING ELEMENT AS A COOKING ZONE IN A CUTOUT OF A COOKING SURFACE", is hereby incorporated by reference as if set forth in its entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all; of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 197 46 845.4, filed on Oct. 23, 1997, having inventors Bernd Schultheis and Martin Taplan, and DE-OS 197 46 845.4 and DE-PS 197 46 845.4, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A device for cooking food, said device comprising:

a cook top, said cook top defining a plane;

said cook top comprising a cutout portion;

a hot plate comprising a carrier and an electrical heating element;

said hot plate being disposed at said cutout portion of said cook top;

said cook top comprising a first portion, said first portion being disposed about and adjacent said cutout portion of said cook top;

said first portion of said cook top being configured to be disposed to project upwardly a substantial distance from said plane of said cook top;

said hot plate being disposed adjacent to and being disposed above said upwardly projecting portion of said cook top;

said hot plate and said upwardly projecting portion being configured to permit movement of said hot plate due to thermal expansion of said hot plate relative to said projecting portion and to permit movement substantially parallel to and above said plane of said cook top; and said upwardly projecting portion being configured and disposed to support said hot plate.

2. The device according to claim 1 wherein:

a part of said cook top adjacent said upwardly projecting portion and said upwardly projecting portion together comprise a structure about said cutout portion;

said part is disposed outward of said upwardly projecting portion;

said structure comprises a one-piece continuous substantially uniform structure made from substantially the same material therealong; and said part extends a substantial distance outward from said upwardly projecting portion.

3. The device according to claim 2 wherein:

said projecting portion extends out of the plane of said cook top;

said projecting portion is configured and disposed to form an elevated portion;

said elevated portion is configured and disposed to form a bearing for said heating arrangement; and said elevated portion comprises one of (a) (b) and (c):

(a) a cone frustrum;

(b) a spherical segment; and (c) a cone.

4. The device according to claim 3 comprising:

said cook top comprising first and second sides, said first side being configured to be disposed above said second side;

said hot plate being disposed adjacent said first side of said cook top;

a cover to cover a region below said cutout of said cook top;

said cover being disposed adjacent said second side of said cook top and adjacent said cutout portion of said cook top;

said cover being disposed to abut said second side of said cook top;

said cover being disposed to form a substantially enclosed region with said cook top and said hot plate, adjacent said cutout portion of said cook top;

a connecting element to hold said heating arrangement adjacent said cutout portion of said cook top;

said connecting element being securely connected to said hot plate; and said connecting element being releasably connected to said cover.

5. The device according to claim 4 wherein:

said carrier comprises a ceramic of high thermal conductivity;

said cook top comprises at least one of (d), (e), (f), and (g):

(d) glass-ceramic;

(e) glass;

(f) ceramic; and (g) metal;

said elevated portion comprises a surface, said surface of said elevated portion being disposed substantially parallel to said plane of said cook top;

said projecting portion defines the outside of said cutout portion of said cook top;

said carrier comprises an outer portion;

said outer portion of said carrier is disposed to overlap said projecting portion of said cook top; and said hot plate is connected in said cutout.

6. The device according to claim 5 wherein said elevated portion comprises one of (h), (i), and (j):

(h) a circular portion;

(i) an oval portion; and (j) an elliptical portion.

7. The device according to claim 6 wherein said elevated portion comprises at least one of: a circular cone frustrum, and a circular cone.

8. The device according to claim 7 wherein said cover is one of (k) and (l):

(k) formed from said cook top by shaping; and (l) a separate piece from said cook top, said separate piece comprising at least one of: metal, and plastic.

9. The device according to claim 8 wherein:

said cover comprises at least one orifice;

said at least one orifice is disposed and configured to permit said connecting element to be firmly and releasably connected to said cover;

said connecting element comprises one of (m) and (n):

(m) at least one snap hook;

each of said at least one snap hook comprising a nose portion; and said nose portion of each of said at least one snap hook being configured and disposed to connect said connecting element to said cover through a corresponding one of said at least one orifice; and (n) at least one threaded bolt;

said at least one thread bolt being disposed through a corresponding one of said at least one orifice; and at least one threaded nut, said at least one threaded nut being disposed on a corresponding one of said at least one threaded bolt to secure said cover to said connecting element.

10. The device according to claim 9 comprising:

said fastening element being hard-soldered to said hot plate;

a gasket;

said elevated portion comprising a contact portion to contact said hot plate;

said gasket being disposed at least one of: between said contact portion and said hot plate to contact said hot plate and said contact portion, and between said cover and said cook top to contact said cover and said cook top;

said gasket comprises at least one of: a graphite containing material and a ceramic fiber material;

an insulating material;

said insulating material being disposed in said substantially enclosed region;

said insulating material being at least one of: heat insulating; and electrically insulating;

heating conductors disposed in said substantially enclosed region;

electrical leads disposed in said substantially enclosed region;

cable strain relief devices disposed in said substantially enclosed region; and cable leadthroughs disposed in said substantially enclosed region.

11. A device for cooking food, said device comprising:

a cook top, said cook top defining a plane;

said cook top comprising a cutout portion;

a hot plate comprising a carrier and an electrical heating element;

said hot plate being disposed at said cutout portion of said cook top;

said cook top comprising a first portion, said first portion being disposed about and adjacent said cutout portion of said cook top;

said first portion of said cook top being configured to be disposed to project upwardly a substantial distance from said plane of said cook top;

a part of said cook top adjacent said upwardly projecting portion and said upwardly projecting portion together comprising a structure about said cutout portion;

said part being disposed outward of said upwardly projecting portion;

said structure comprising a one-piece continuous substantially uniform structure made from substantially the same material therealong;

said part extending a substantial distance outward from said upwardly projecting portion;

said hot plate being disposed adjacent to and being disposed above said upwardly projecting portion of said cook top; and said upwardly projecting portion being configured and disposed to support said hot plate.

12. The device according to claim 11 wherein said hot plate and said upwardly projecting portion are configured to permit movement of said hot plate due to thermal expansion of said hot plate relative to said projecting portion and to permit movement substantially parallel to and above said plane of said cook top.

13. The device according to claim 12 wherein:

said projecting portion extends out of the plane of said cook top;

said projecting portion is configured and disposed to form an elevated portion;

said elevated portion is configured and disposed to form a bearing for said heating arrangement; and said elevated portion comprises one of (a) (b) and (c):

(a) a cone frustrum;

(b) a spherical segment; and (c) a cone.

14. The device according to claim 13 comprising:

said cook top comprising first and second sides, said first side being configured to be disposed above said second side;

said hot plate being disposed adjacent said first side of said cook top;

a cover to cover a region below said cutout of said cook top;

said cover being disposed adjacent said second side of said cook top and adjacent said cutout portion of said cook top;

said cover being disposed to abut said second side of said cook top;

said cover being disposed to form a substantially enclosed region with said cook top and said hot plate, adjacent said cutout portion of said cook top;

a connecting element to hold said heating arrangement adjacent said cutout portion of said cook top;

said connecting element being securely connected to said hot plate; and said connecting element being releasably connected to said cover.

15. The device according to claim 14 wherein:

said carrier comprises a ceramic of high thermal conductivity;

said cook top comprises at least one of (d), (e), (f), and (g):

(d) glass-ceramic;

(e) glass;

(f) ceramic; and (g) metal;

said elevated portion comprises a surface, said surface of said elevated portion being disposed substantially parallel to said plane of said cook top;

said projecting portion defines the outside of said cutout portion of said cook top;

said carrier comprises an outer portion;

said outer portion of said carrier is disposed to overlap said projecting portion of said cook top; and said hot plate is connected in said cutout.

16. The device according to claim 15 wherein said elevated portion comprises one of (h), (i), and (j):

(h) a circular portion;

(i) an oval portion; and (j) an elliptical portion.

17. The device according to claim 16 wherein said elevated portion comprises at least one of: a circular cone frustrum, and a circular cone.

18. The device according to claim 17 comprising:

said cover being one of (k) and (l):

(k) formed from said cook top by shaping; and (l) a separate piece from said cook top, said separate piece comprising at least one of: metal, and plastic;

said cover comprising at least one orifice;

said at least one orifice being disposed and configured to permit said connecting element to be firmly and releasably connected to said cover;

said fastening element being hard-soldered to said hot plate;

a gasket;

said elevated portion comprising a contact portion to contact said hot plate;

said gasket being disposed at least one of: between said contact portion and said hot plate to contact said hot plate and said contact portion, and between said cover and said cook top to contact said cover and said cook top;

said gasket comprises at least one of: a graphite containing material and a ceramic fiber material;

an insulating material;

said insulating material being disposed in said substantially enclosed region;

said insulating material being at least one of: heat insulating; and electrically insulating;

heating conductors disposed in said substantially enclosed region;

electrical leads disposed in said substantially enclosed region;

cable strain relief devices disposed in said substantially enclosed region;

cable leadthroughs disposed in said substantially enclosed region; and said connecting element comprising one of (m) and (n):

(m) at least one snap hook;

each of said at least one snap hook comprising a nose portion; and said nose portion of each of said at least one snap hook being configured and disposed to connect said connecting element to said cover through a corresponding one of said at least one orifice; and (n) at least one threaded bolt;

said at least one thread bolt being disposed through a corresponding one of said at least one orifice; and at least one threaded nut, said at least one threaded nut being disposed on a corresponding one of said at least one threaded bolt to secure said cover to said connecting element.

19. A device for cooking food, said device comprising:

a cook top, said cook top defining a plane;

said cook top comprising a cutout portion;

a hot plate comprising a carrier and an electrical heating element;

said hot plate being disposed at said cutout portion of said cook top;

said cook top comprising a first portion, said first portion being disposed about and adjacent said cutout portion of said cook top;

said first portion of said cook top being configured to be disposed to project upwardly a substantial distance from said plane of said cook top;

a part of said cook top adjacent said upwardly projecting portion and said upwardly projecting portion together comprising a structure about said cutout portion;

said part being disposed outward of said upwardly projecting portion;

said structure comprising a one-piece, continuous structure made from substantially the same material;

said part extending a substantial distance outward from said upwardly projecting portion;

said hot plate being disposed adjacent to and being disposed above said upwardly projecting portion of said cook top; and said upwardly projecting portion being configured and disposed to support said hot plate.

20.The device according to claim 19 wherein said hot plate and said upwardly projecting portion are configured to permit movement of said hot plate due to thermal expansion of said hot plate relative to said projecting portion and to permit movement substantially parallel to and above said plane of said cook top.

* * * * *

UNITED STATES PATENT AND TRADEMARK OFFICE
CERTIFICATE OF CORRECTION

PATENT NO. : 6,050,176
DATED : April 18, 2000
INVENTOR(S) : Bernd Schultheis and Martin Taplan It is certified that error appears in the above-identified patent and that said Letters Patent is hereby corrected as shown below:

Title page,
Item [56], under the U.S. PATENT DOCUMENTS section, add the following reference:

| | | |
|---|---|---|
| -- 4517454 | 5/1985 | Mantelet --. |

Title page,
Item [56], under the FOREIGN PATENT DOCUMENTS section, add the following references:

| | | |
|---|---|---|
| -- 3545453 | 7/1987 | Fed. Rep. of Germany |
| 31879 | 6/1983 | Austria |
| 2933349 | 3/1981 | Fed. Rep. of Germany --. |

Column 5,
Line 1, before 'substantially', delete "3.5*10 $^{6}$/K)," and insert -- 3.5*10$^{-6}$/K), --.

Column 8,
Line 36, after 'Christof', delete "K6ster" and insert -- Köster --.

Signed and Sealed this

Fourth Day of September, 2001

Attest:

Nicholas P. Godici

NICHOLAS P. GODICI

*Attesting Officer* *Acting Director of the United States Patent and Trademark Office*